(12) United States Patent
Vito et al.

(10) Patent No.: US 9,861,876 B2
(45) Date of Patent: Jan. 9, 2018

(54) IMPACT RESISTANT PAD

(71) Applicant: Matscitechno Licensing Company, Kennett Square, PA (US)

(72) Inventors: Robert A. Vito, Kennett Square, PA (US); Michael Foerster, Newtown Square, PA (US)

(73) Assignee: Matscitechno Licensing Company, Kennett Square, PA (US)

( * ) Notice: Subject to any disclaimer, the term of this patent is extended or adjusted under 35 U.S.C. 154(b) by 228 days.

(21) Appl. No.: 14/718,260

(22) Filed: May 21, 2015

(65) Prior Publication Data

US 2016/0339323 A1    Nov. 24, 2016

(51) Int. Cl.

| | |
|---|---|
| *A63B 71/08* | (2006.01) |
| *B32B 3/26* | (2006.01) |
| *B32B 27/06* | (2006.01) |
| *A63B 71/12* | (2006.01) |
| *A63B 71/14* | (2006.01) |
| *A63B 71/10* | (2006.01) |
| *A42B 3/12* | (2006.01) |
| *B32B 3/30* | (2006.01) |
| *B32B 37/26* | (2006.01) |
| *A63B 102/14* | (2015.01) |

(Continued)

(52) U.S. Cl.
CPC .............. *A63B 71/08* (2013.01); *A63B 71/12* (2013.01); *A63B 71/141* (2013.01); *B32B 3/263* (2013.01); *B32B 27/06* (2013.01); *A42B 3/125* (2013.01); *A63B 71/10* (2013.01); *A63B 2102/14* (2015.10); *A63B 2102/18* (2015.10); *A63B 2102/22* (2015.10); *A63B 2243/0025* (2013.01); *A63B 2243/0066* (2013.01); *B32B 3/30* (2013.01); *B32B 2037/266* (2013.01); *B32B 2307/558* (2013.01); *B32B 2571/00* (2013.01); *Y10T 428/24612* (2015.01)

(58) Field of Classification Search
CPC ..... Y10T 428/24479; Y10T 428/24612; A63B 71/08; A63B 71/10; A63B 71/12; A42B 3/125; B32B 3/30; B32B 2037/56; B32B 2037/266
See application file for complete search history.

(56) References Cited

U.S. PATENT DOCUMENTS 4,364,188 A * 12/1982 Turner ..................... A43B 5/06
                                                                36/129
6,073,271 A     6/2000 Alexander
(Continued)

OTHER PUBLICATIONS

International Search Report and Written Opinion for International Application No. PCT/US2016/033041, dated Oct. 12, 2016, 8 pages.

*Primary Examiner* — Donald J Loney
(74) *Attorney, Agent, or Firm* — RatnerPrestia

(57) ABSTRACT

Apparatuses and methods thereof for employing impact resistant materials, pads, and layers are disclosed. Aspects of the invention include, an impact resistant material including an elastomer material having a base layer and a plurality of raised portions extending upward from the base layer, wherein each of the plurality of raised portions has a top surface and at least three primary sides. Each of the at least three primary sides having a middle region positioned closer to a center of the respective raised portion than either end region of the respective primary side.

14 Claims, 3 Drawing Sheets

(51) Int. Cl.
  *A63B 102/22* (2015.01)
  *A63B 102/18* (2015.01)

(56) References Cited

U.S. PATENT DOCUMENTS

| | | |
|---|---|---|
| 6,880,269 B2 | 4/2005 | Falone |
| 6,959,505 B2 * | 11/2005 | Poe .................. A43B 1/0009 36/141 |
| 7,765,622 B2 | 8/2010 | Wiles |
| 2007/0209098 A1 | 9/2007 | Peart |
| 2012/0036620 A1 | 2/2012 | Harris |
| 2014/0068842 A1 | 3/2014 | Vito |

* cited by examiner

IMPACT RESISTANT PAD

FIELD OF THE INVENTION

The invention relates generally to the field of protective gear and materials, and more particularly, to impact resistant pads.

BACKGROUND OF THE INVENTION

Conventionally, participants in sports (e.g. football, rugby, baseball, lacrosse, field hockey, etc.) wear protective gear to cushion the force of impacts that are regularly received during those events. In recent years, the dangers of high-force impacts during such contact sports have been a matter of focus. The dangers of these impacts can be diminished or minimized by effectively cushioning participants from the forces of impacts.

In general, protective pads have been configured from continuous layers of uniform materials to avoid gaps or areas of reduced protection. As a result, many pads fail to provide sufficient comfort while maintaining high levels of protection. Improved structures, such as impact-resistant pads, are desired to better protect and lessen the impact forces experienced by those participants, while providing a high level of comfort.

SUMMARY OF THE INVENTION

Aspects of the invention are directed to impact resistant materials. In accordance with one aspect of the present invention, an impact resistant material includes an elastomer material having a base layer and a plurality of raised portions extending upward from the base layer, wherein each of the plurality of raised portions has a top surface and at least three primary sides, and each of the at least three primary sides having a middle region positioned closer to a center of the respective raised portion than either end region of the respective primary side.

Additional aspects of the invention are directed to impact resistant pads. According to one aspect of the present invention, the impact resistant pads include an impact resistant material and a high tensile strength fibrous material coupled to the impact resistant material. The impact resistant material and the high tensile strength fibrous material are shaped to correspond to a portion of an anatomy of a user. The impact resistant material having a base layer and a plurality of raised portions extending upward from the base layer, each of the plurality of raised portions has a top surface and at least three sides. The impact resistant pads further include at least one side that is configured as a secondary side, the secondary side having a middle region positioned farther from a center of the respective raised portion than either end region of the respective secondary side. Additionally, the base layer has a length and a width corresponding to a length and width of the impact resistant pad, and a surface of the base layer is adjacent to a surface of the high tensile strength fibrous material.

Further aspects of the present invention are directed to impact resistant layers. In accordance with one aspect of the present invention, the impact resistant layers include an impact resistant material, the impact resistant material having a base layer and a plurality of raised portions extending upward from the base layer, wherein each of the plurality of raised portions has a top surface and at least three primary sides and at least three secondary sides. Each of the at least three primary sides have a middle region positioned closer to a center of the respective raised portion than either end region of the respective primary side. Each of the at least three secondary sides have a middle region that is positioned farther from the center of the respective raised portion than either end region of the respective secondary side.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The exemplary apparatuses disclosed herein are configured to provide improved protection while maintaining high levels of user comfort. The impact resistant pads are particularly suited to be employed as a sole source of protection or in combination with other protective pads and/or layering. Moreover, the impact resistant pads may generally be employed under protective gear, clothing, or devices, where impact resistance is desired, e.g., in a helmet, glove, shoulder pad, or clothing; employed as part of a safety device, e.g., attached to a car seat belt, steering wheel, or dashboard; and/or employed as a cushion to protect fragile items, e.g., incorporated into suitcases, brief cases, and safe boxes. Additionally, the impact resistant pads disclosed herein, are advantageously designed to be able to be incorporated during manufacturing processes or at a later date by an end user as a modification or improvement.

While the exemplary embodiments of the invention are described herein with respect to athletic activities, it will be understood that the invention is not so limited. Suitable applications for apparatuses of the present invention include, for example, military gear, police gear, and construction gear. Other suitable applications will be readily understood by one of ordinary skill in the art from the description herein. Additionally, as used herein, the term "impact-resistant" is intended to encompass any object that partially or fully lessens, diminishes, dissipates, deflects, or absorbs the mechanical force of an impact.

Figure 1:
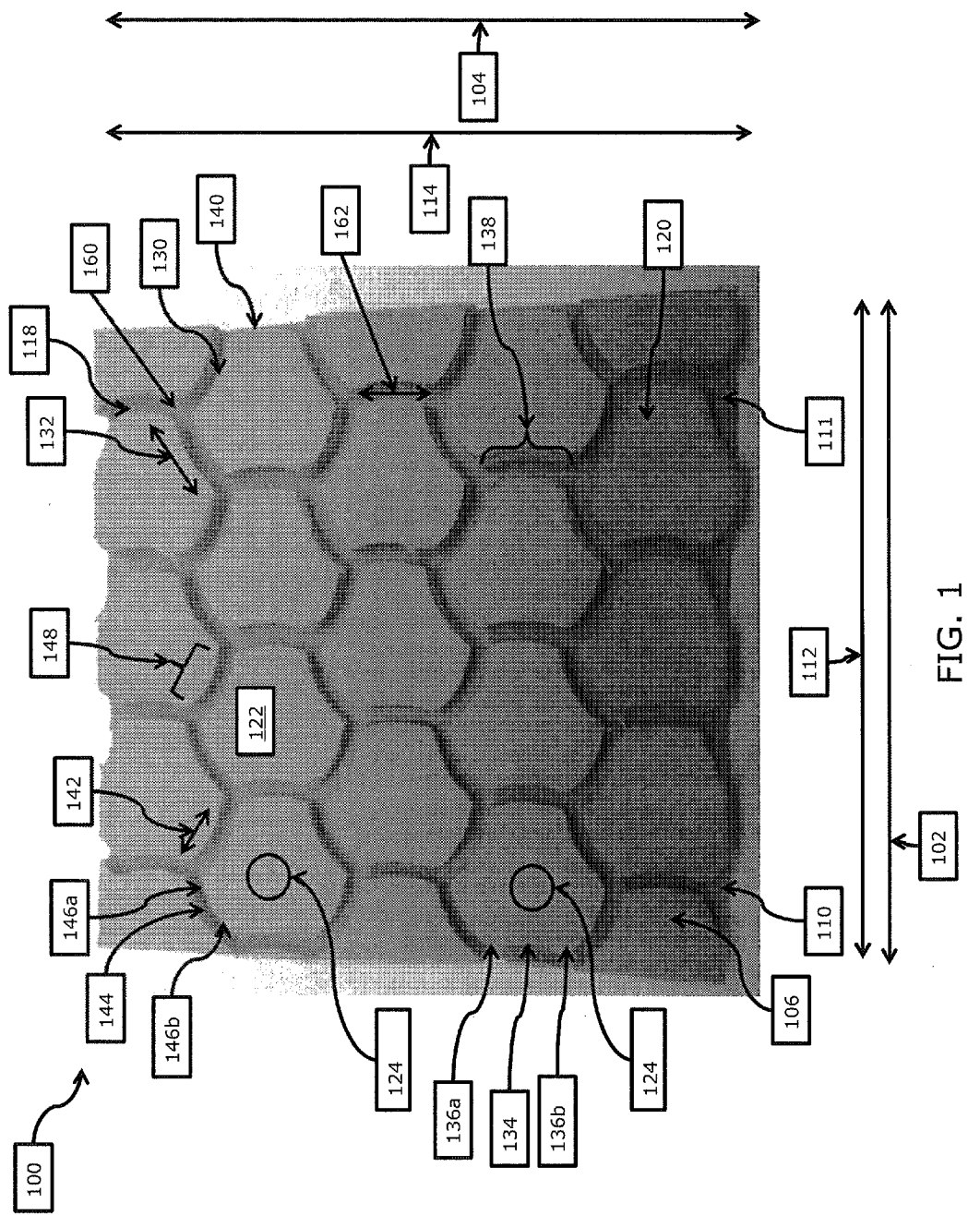
FIG. 1 is a diagram illustrating a top-view of an exemplary impact resistant pad in accordance with aspects of the present invention.
Figure 2:
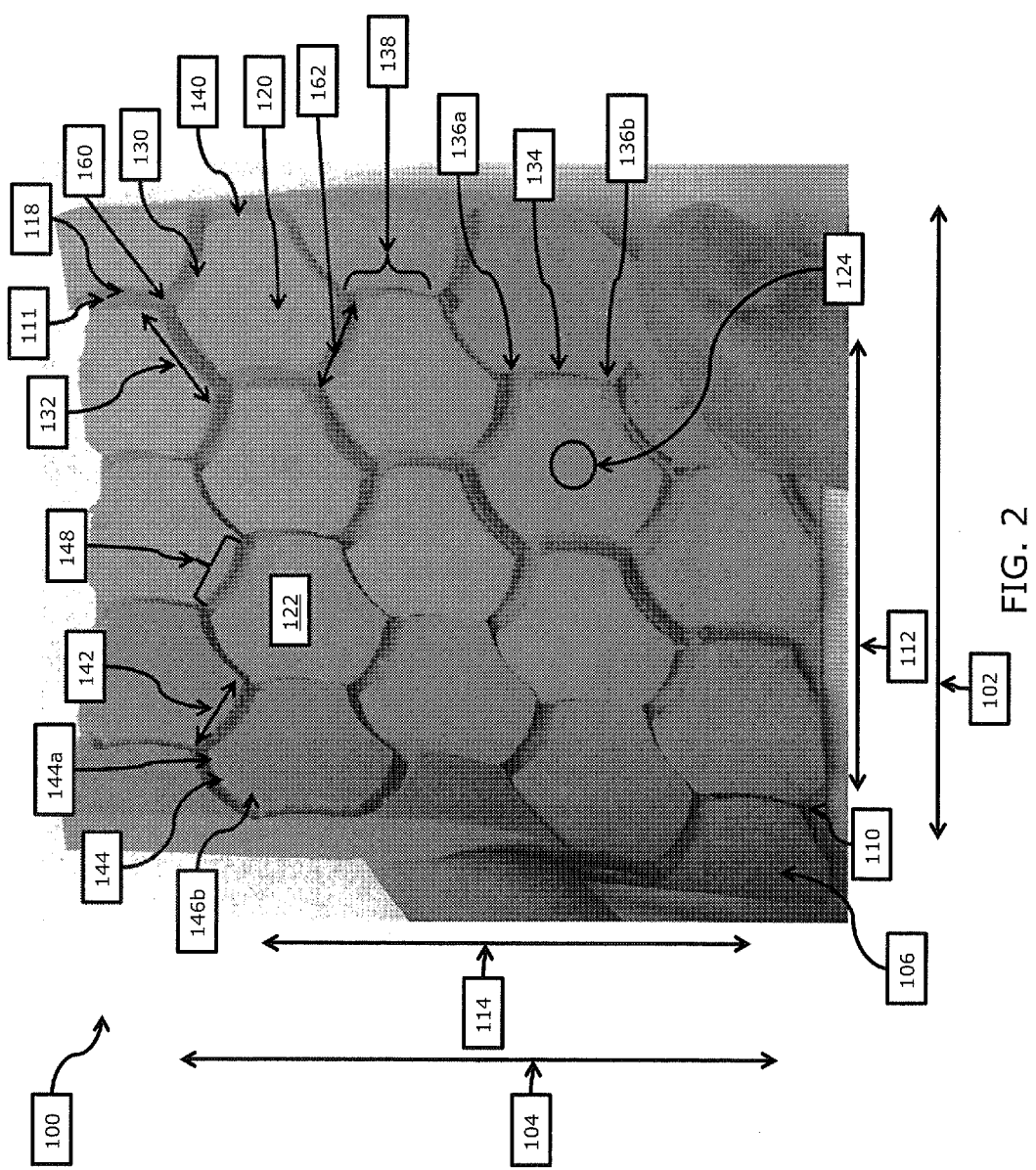
FIG. 2 is a diagram illustrating a top-view of the exemplary impact resistant pad of FIG. 1 in a non-planer configuration.
Figure 3:
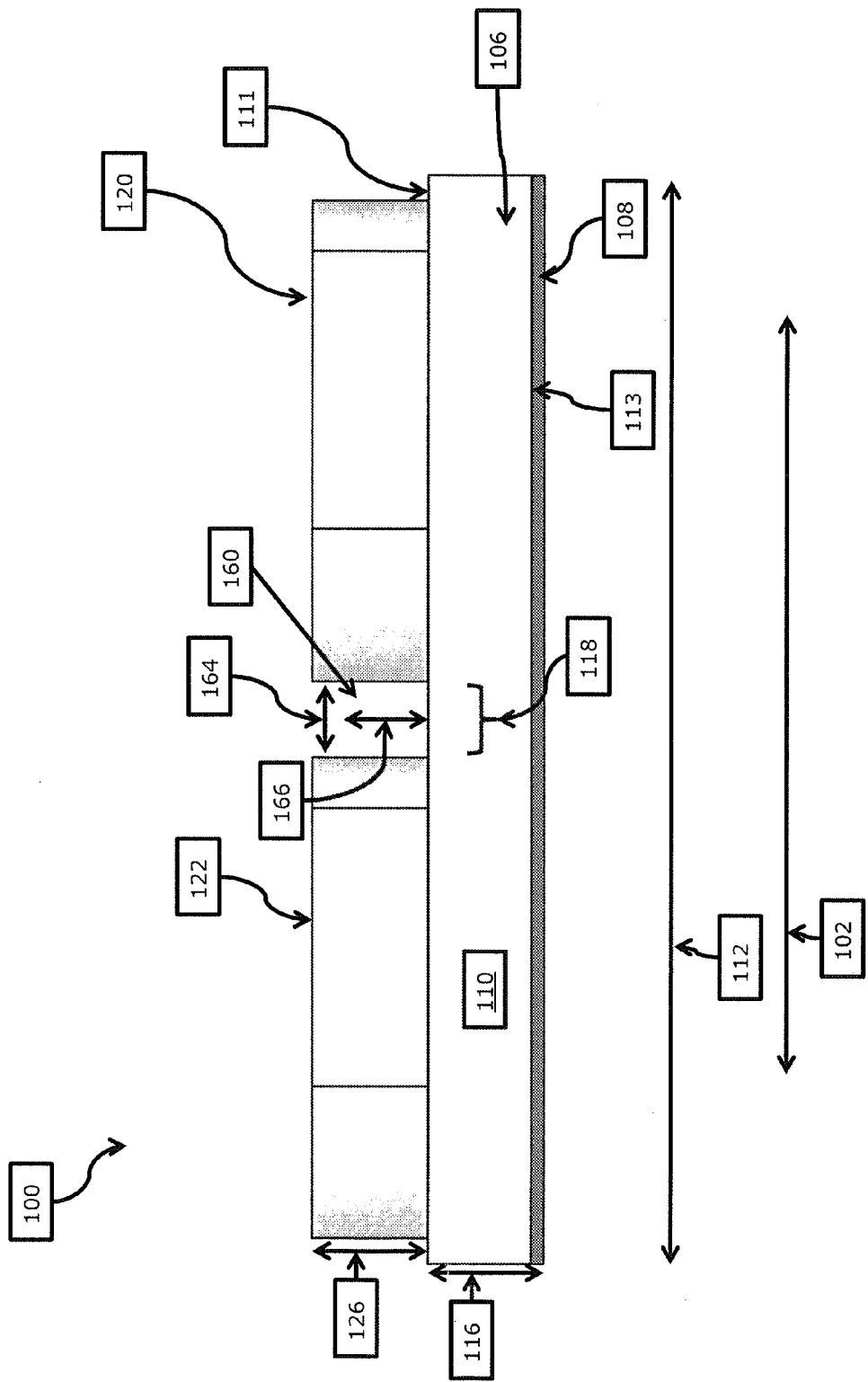
FIG. 3 is a diagram illustrating a side-view of the exemplary impact resistant pad of FIG. 1.

Referring now to the drawings, FIGS. 1-3 illustrate an exemplary impact resistant pad 100 in accordance with aspects of the present invention. Generally, the amount of protection provided by a protective pad may be controlled by varying the thickness of the pad. Advantageously, the thickness of the impact resistant pad 100 may be increased without reducing the bendability of the impact resistant pad 100. To this effect, as a general overview, impact resistant pad 100 includes a base layer 110 and a plurality of raised portions 120. Additional details regarding impact resistant pad 100 are described herein.

Generally, impact resistant pad 100 includes one or more high impact resistant materials 106, which may be formed into one or more layers, as shown in FIG. 3. Preferably, the impact resistant material 106 is an elastomer. Suitable elastomer materials include, but are not limited to, urethane rubbers, silicone rubbers, nitrile rubbers, butyl rubbers, acrylic rubbers, natural rubbers, styrene-butadiene rubbers, and the like. In general, any suitable elastomer material can be used to form the above-described elastomeric layers without departing from the scope of the present invention. Elastomeric material may provide impact-resistance by absorbing and/or dissipating the forces of impacts along the surface of the elastomeric material. Alternatively, the one or more layers of impact resistant materials 106 may be formed of non-elastomer materials so long as the materials provide the desired impact resistant characteristics.

Impact resistant pad 100 may also include one or more high tensile strength fibrous materials 108, as shown in FIG. 3. High tensile strength fibrous materials 108 may be woven to form a separate cloth layer or may be integrated into the layer of impact resistant material 106. Suitable high tensile strength fibrous materials 108 include, but are not limited to, aramid fibers, fiberglass, or other high tensile strength fibers. The high tensile strength fibrous materials 108 may block and/or redirect impact energy.

Various arrangements of one or more layers comprising either impact resistant materials 106, high tensile strength fibrous materials 108, or combinations thereof will be apparent to one of skill in the art based on the disclosures and teachings herein and ordinary design needs associated with the specific application of impact resistant pad 100. In one exemplary embodiment, the impact resistant pad 100 includes one or more layers of impact resistant materials 106. In another embodiment, the impact resistant pad 100 does not include a separate layer of high tensile strength fibrous materials 108.

Alternatively or additionally, the impact resistant pad 100 may have one or more layers of impact resistant materials 106 and one or more layers of high tensile strength fibrous materials 108. For example, impact resistant pad 100 may include an inner layer of elastomeric materials 106 and an outer adjacent layer of high-tensile strength fibrous materials 108. The outer layer of the high tensile strength fibrous materials 108 may dissipate impacts along the surface while the inner layer of impact resistant materials 106 may absorb the impact. For example, a layer of high tensile strength fibrous materials 108 is located between two or more layers of impact resistant materials 106. Different arrangements of layers containing primarily impact resistant materials 106 and layers containing primarily high tensile strength fibrous materials 108 may have synergistic effects.

A protective coating, e.g., a durable plastic, may be placed on the outer adjacent layer of the impact resistant materials 106 and/or high tensile strength fibrous materials 108 to protect such layers from rips, tears, or punctures.

Impact resistant pad 100 may be configured so that the impact resistant materials 106 and/or the high tensile strength fibrous materials 108 are shaped to corresponds to a portion of an anatomy of a user. Desirably, the impact resistant materials 106 and/or the high tensile strength fibrous materials 108 preserve their shape after receiving an impact or being deformed. In particular, impact resistant pads 100 are desirably formed of a material that retains its shape after being bent, folded, squeezed, or otherwise deformed. Additional description of materials for forming a lay of impact resistant materials 106 may be found in U.S. patent application Ser. No. 09/978,130, the contents of which are incorporated herein by reference in their entirety for all purposes.

Base layer 110 may be formed of impact resistant materials 106 and/or high tensile strength fibrous materials 108. The base layer 110 has a length 112 and a width 114, which may be substantially the same as the length 102 and width 104 of the impact resistant pad 100, as shown in FIG. 1. The base layer 110 has a thickness 116 that may be substantially uniform along the length 112 and/or width 114, as shown in FIG. 3. In one embodiment, the base layer 110 is continuous, though in other embodiments the base layer 110 need not be continuous, based on the intended application of pad 100. For example, the base layer 110 may contain holes, slots, or openings to facilitate the movement of air and/or heat transfer between the top surface 111 and the bottom surface 113 of base layer 110 and impact resistant pad 100.

A plurality of raised portions 120 extend upward from the base layer 110. The plurality of raised portions 120 may be formed of impact resistant materials 106 and/or high tensile strength materials 108. The plurality of raised portions 120 may be integrally formed with the base layer 110. Suitable methods for producing a plurality of raised portions 120 integrally formed with a base layer 110 would be readily understood by one of skill in the art. For example, the base layer 110 and the plurality of raised portions 120 may be formed from one or more layers of starting material by way of removing select portions or sections from the one or more layers of starting materials. Alternatively, the base layer 110 and plurality of raised portions 120 may be formed by molding a foam or rubber material into the desired shape. By way of further example, the plurality of raised portions 120 may be formed separately and affixed to the base layer 110.

Each of the plurality of raised portions 120 has a top surface 122 and at least one side that extends from the base layer 110 to the top surface 122. The top surface 122 of each of the plurality of raised portions 120 may have a coating or layer of material, e.g., high tensile strength fibrous materials 108, to prevent rips, tears, or punctures to the plurality of raised portions 120 and provided additional protection to the use by further dissipating or absorbing the force of an impact.

The plurality of raised portions 120 may have one or more primary sides 130. The number of primary sides 130 a raised portion 120 may have includes one, two, three, four, five, six, etc. In an exemplary embodiment, each raised portion 120 has exactly three primary sides 130, as shown in FIG. 1. Primary sides 130 have a middle region 134 that is positioned closer to a center 124 of the respective raised portion 120 than either end region 136 of the primary side 130, as shown in FIG. 1.

The plurality of raised portions 120 may also have one or more secondary sides 140, e.g., the number of secondary sides 140 a raised portion 120 may have includes one, two, three, four, five, six, etc. In an exemplary embodiment, each raised portion 120 has exactly three secondary sides 140, as shown in FIG. 1. Secondary sides 140 have a middle region 144 positioned farther from the center 124 of the respective raised portion 120 than either end region 146 of the respective secondary side 140. Additionally or alternatively, the plurality of raised portions 120 may have one or more sides that are neither primary sides 130 nor secondary sides 140.

At least one of the primary sides 130 may have one or more curvatures 138. In one embodiment, all of the primary sides 130 have a curvature 138. In another embodiment, less than all of the primary sides 130 have a curvature 138. Where multiple primary sides 130 have a curvature 138, the curvature 138 of two or more of the primary sides 130 may be substantially equal, including but not limited to embodiments where the curvature 138 of each of the primary sides 130 is substantial equal. The curvature 138 of primary sides 130 may extend from one end region 136a to the other end region 136b of the respective primary side 130. In at least one embodiment, however, curvature 138 does not extend from one end region 136a to the other end region 136b of the primary side 130. Alternatively, one or more primary side 130 may be configured as two straight portions starting from the end regions 136 that slant inward toward the center 124 of the respective raised portion 120.

The primary sides 130 have a length 132, which is measured as the distance along the primary side 130. In one embodiment, the length 132 of each primary side 130 is substantially equal. In another embodiment, the length 132 of one or more of the primary sides 130 is different from the length 132 of another primary side 130.

At least one of the secondary sides 140 also may have one or more curvatures 148. In one embodiment, all of secondary sides 140 have a curvature 148. In another embodiment, less than all of the secondary sides 140 have a curvature 148. The curvature 148 of two or more secondary sides 140 may be substantially equal, including but not limited to embodiments where the curvature 148 of each of the secondary sides 140 are substantial equal. The curvature 148 of secondary sides 140 may extend from one end region 146a to the other end region 146b of the respective secondary side 140. In at least one embodiment, however, curvature 148 does not extend from one end region 146a to the other end region 146b of the secondary side 140. Alternatively, one or more secondary sides 140 may be configured as two straight portions starting from the end regions 146 that slant outward away from the center 124 of the respective raised portion 120.

The secondary sides 140 have a length 142, which is measured as the distance along the secondary side 140. In one embodiment, the length 142 of each secondary side 140 is substantially equal. In another embodiment, the length 142 of one or more of the secondary sides 140 is different from the length 142 of another secondary side 140.

The plurality of raised portions 120 may include both primary sides 130 and secondary sides 140. The plurality of raised portions 120 may have an equal number of primary sides 130 and secondary sides 140, e.g., the plurality of raised portions 120 may have one, two, three, four, five, six, etc. of primary sides 130 and an equal number of secondary sides 140. In an exemplary embodiment, the plurality of raised portions 120 has exactly three primary sides 130 and three secondary sides 140, as shown in FIG. 1. In one embodiment, each of the plurality of raised portions 120 has either more primary sides 130 or more secondary sides 140. In another embodiment, the plurality of raised portions 120 contains raised portions 120 with an equal number of primary sides 130 and secondary sides 140 and raised portions 120 with an unequal number of primary sides 130 and secondary sides 140.

The plurality of raised portions 120 may have one or more primary sides 130 that have a substantially equal curvature 138. Additionally, the plurality of raised portions 120 may also one or more secondary sides 140 that have a substantially equal curvature 148. In one embodiment, the curvature 138 of each primary side 130 is substantially equal to the curvature 148 of each secondary side 140, e.g., primary side 130 may have a concave curvature 138 that is substantially equal to a convex curvature 148 of a secondary side 140.

As shown in FIG. 1, the middle region 134 of each of the primary sides 130 may be closer to the center 124 of the respective raised portion 120 than the middle region 144 of any of the secondary sides 140. In an alternative embodiment, the middle region 144 of each of the secondary sides 140 is closer to the center 124 of the respective raised portion 120 than the middle region 134 of any of the primary sides 130.

The structure of each raised portion 120 is partially dependent on the arrangement, if any, of the primary sides 130 and/or secondary sides 140. The primary sides 130 may be connected to the secondary sides 140 by way of the end regions 136 and 146 of the respective sides. In the exemplary embodiment shown in the figures, which has three primary sides 130 and three secondary sides 140, each of the at least three secondary sides 140 connects to one of the at least three primary sides 130. In this embodiment, each of the at least three secondary sides 140 may be further configured to be between two of the at least three primary sides 130. The plurality of raised portions 120 may also be configured to have primary sides 130 that alternate with secondary sides 140, wherein each end region 136 of each primary side 130 is connected to a secondary side 140 and each end region 146 of each secondary side 140 is connected to a primary side 130.

The structure of the plurality of raised portions 120 may also be dependent on the lengths 132 and/or 142 of the primary sides 130 and/or secondary sides 140. In one embodiment, the length 132 of each of the primary sides 130 is substantially equal to the length 142 of each of the secondary sides 140. In another embodiment, the length 132 of at least one primary side 130 is different than the length 142 of at least one secondary side 140 of the same raised portion 120. In one embodiment, the length 132 of the primary sides 130 may be from 10% to 70% larger than the length 142 of the secondary sides 140 of the same raised portion 120. In another embodiment, the length 132 of the primary sides 130 is from 25% to 55% larger than the length 142 of the secondary sides 140.

As described hereafter, the structure of the plurality of raised portions 120, e.g., the orientation, shape, and size of the raised portions 120, provided by the primary sides 130 and/or secondary sides 140, as well as the arrangement of the plurality of raised portions 120 with respect to each other, may facilitate advantageous characteristics for the impact resistant pad 100, e.g., improved protection and comfort to the user.

As illustrated in FIG. 3, the arrangement of the plurality of raised portions 120 may provide at least one channel 160. In one embodiment, the plurality of raised portions 120 is positioned to provide a channel 160 between at least two raised portions 120. In another embodiment, the plurality of raised portions 120 may be positioned so that at least one primary side 130 of each of the plurality of raised portions 120 faces the secondary side 140 of another one of the plurality of raised portions 120, whereby a channel 160 is formed between the primary side 130 of one of the plurality of raised portions 120 and the secondary side 140 of the other one of the raised portions 120. The plurality of raised portions 120 may be arranged so that each of primary side 130 of each of the raised portions 120 faces a secondary side 140 of another one of the plurality of raised portions 120. This configuration produces a channel 160 that is delineated by primary sides 130 and secondary sides 140, and thus, channel 160 has a shape corresponding to the respective raised portions 120. In one embodiment, the channel 160 bends in accordance with the curvatures 138 and 148 of the primary side 130 and secondary side 140 respectively.

Channel 160 may have a width 164 corresponding to the distance between the two raised portions 120 that form such channel 160. The depth 166 of the channel 160 may correspond to the height 126 of the raised portions 120 that form such channel 160. The channel 160 may also have a length 162 that corresponds to one or more lengths, e.g., lengths 132 and 142, of the sides of the raised portions 120 that form such channel 160. The depth 166, length 162, and/or width 164 of the channel 160 may roughly be determined by averaging the respective heights 126, lengths 132 and/or 142 of the sides 130 and/or 140, and/or distances between the raised portions 120 that form such channel 160.

In an exemplary embodiment, channel 160 is adjacent to a prime bending portion 118 of the base layer 110. Prime bending portion 118 extends from a bottom surface 113 of base layer 110 to a top surface 111 of base layer 110. In one embodiment, prime bending portion 118 includes the portion of the base layer 110 that is not affixed and/or in contact with one of the plurality of raised portions 120. Upon bending, folding, or otherwise deformation of the impact resistant pad 100, prime bending portion 118 may deform prior to and/or more than other portions of the base layer 110.

Impact resistant pad 100 advantageously provides improved protection, while not sacrificing bendability, by employing both a base layer 110 and a plurality of raised portions 120. The level of protection provided by impact resistant pad 100 may be improved by increasing the thickness 116 of the base layer 110 and/or the height 126 of the raised portions 120 and/or the width of channels 160. For example, by employing channels 160, improved protection may be obtained by increasing the thickness 106 of the impact resistant pad 100 by way of increasing the height 126 of raised portions 120, while not increasing the thickness 116 of the base layer 110 of the impact resistant pad 100.

In one embodiment, the height 126 of each of the plurality of raised portions 120 is between 10% and 300% of a width 164 of channel 160. Desirably, the height 126 of each of the plurality of raised portions 120 is between 30% and 200% of the width 164 of the channel 160. In another embodiment, each of the plurality of raised portions 120 extends upwards from base layer 110 more than 1/8th of an inch and less than 5/16th of an inch. For protection against more forceful impacts, the raised portions 120 may be configured to extend upwards from the base layer 110 more than 5/16th, e.g., the raised portions 120 may extend more than 7/16th, 9/16th, 11/16th, etc. Each of the plurality of raised portions 120 may have a height 126 that is between 50% and 200% of the thickness 116 of the base layer 110. The plurality of raised portions 120 may alternatively have a height 126 that is between 30% and 100%, 200% and 300%, 300% and 500%, or more than 500% of the thickness 116 of the base layer 110.

In one embodiment, the width 164 of channel 160 is not larger than the height 126 of any of the plurality of raised portions 120. In another embodiment, channel 160 has a width 164 of more than 1/16th of an inch and less than 3/16th of an inch. Yet in another embodiment, the channel 160 has a width 164 that is between from 50% and to 150% of a thickness 116 of the base layer 110.

Impact resistant pad 100 may readily bend or fold in the direction of the top surface 122 of the plurality of raised portions 120 or in the direction of the bottom surface 113 of the base layer 110. Impact resistant pad 100 may be configured to correspond to a portion of an anatomy of a user by being bent, folded, or otherwise deformed to fit the selected anatomy of the user. As the impact resistant pad 100 is bent, folded, or otherwise deformed in the direction of the top surface 122 of the plurality of raised portions 120, the top surfaces 122 of the plurality of raised portions 120 become closer to one another. Accordingly, the likelihood of an impact being received solely by channel 160, e.g., instead of being received, absorbed, and/or dissipated by the protection area, is reduced. The protection area is the total surface area of all of the top surfaces 122 of the plurality of the raised portions 120. In one embodiment, the total area of the channel 160 is between 10% and 40% of the total protection area of the impact resistant pad 100. In another embodiment, the total area of the channel 160 is between 2% and 20% of the total protection area of the impact resistant pad 100. In yet another embodiment, the total area of the channel 160 is between 30% and 60% of the total protection area of the impact resistant pad 100.

The plurality of raised positions 120 may be positioned to form one or more axes of bendability. An axis of bendability may be produced by positioning the plurality of raised portions 120 so that two or more channels 160 between the plurality of raised portions 120 align. The axis of bendability may enable the plurality of raised portions 120 to contact each other at about the same time when impact resistant pad 100 is bent or deformed around the axis of bendability. Desirably, the two or more aligned channels 160 form a non-straight or approximately straight axis of bendability. For example, the aligned channels 160 may form an axis of bendability that zigzags or has slight bends to reduce the likelihood of impacts from linear objects solely contacting the channel 160 of the impact resistant pad 100. By aligning two or more channels 160, the impact resistant pad 100 may bend, fold, or otherwise deform with less force around the axis of bendability. For example, the axis of bendability may reduce the force required to bend or deform impact resistant pad 100 by reducing amount one or more of the raised portions 120 is deformed, e.g., by contacting another raised portion 120, in order to bend or deform the impact resistant pad 100 round the axis of bendability. In one embodiment, the plurality of raised portions 120 are positioned to form three axes of bendability. In another embodiment, the plurality of raised portions 120 are positioned to form six axes of bendability. The positioning of the one or more axes of bendability may enable the impact resistant pad 100 to easily configure to the anatomy of the user.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. An impact resistant material comprising:
an elastomer material, the elastomer material having a base layer and a plurality of raised portions extending upward from the base layer,
wherein each of the plurality of raised portions has a top surface, three primary sides, and three secondary sides, each of the at least three primary sides having a middle region positioned closer to a center of the respective raised portion than either end of the respective primary side, each of the three secondary sides having a middle region that is positioned farther from the center of the respective raised portion than either end of the respective secondary side, wherein each of the three primary sides has a continuous curvature from one of the ends of the respective primary side to the other end of the respective primary side, wherein each of the three secondary sides has a continuous curvature from one of the ends of the respective secondary side to the other end of the respective secondary side, and wherein the plurality of raised portions are positioned so that each of the three primary sides of one of the plurality of raised portions faces and is aligned with a respective secondary side of another one of the plurality of raised portions.

2. The impact resistant material of claim 1, wherein the middle region of each of the three primary sides is closer to the center of the respective raised portion than the middle region of each of the three secondary sides.

3. The impact resistant material of claim 1, wherein the curvatures of each of the three primary sides are substantially equal.

4. The impact resistant material of claim 1, wherein the curvatures of each of the at least three secondary sides are substantially equal.

5. The impact resistant material of claim 1, wherein
the curvatures of each of the three primary sides are substantially equal to the curvatures of each of the three secondary sides.

6. The impact resistant material of claim 1, wherein the three primary sides each have a length and the three secondary sides have a length; and
the length of the three primary sides is different from the length of the three secondary sides.

7. The impact resistant material of claim 6, wherein the length of the three primary sides is from 10% to 70% larger than the length of the three secondary sides.

8. The impact resistant material of claim 1, wherein the ends of each of the at three secondary sides meet with the ends of respective ones of the three primary sides.

9. The impact resistant material of claim 1, wherein a channel is formed between each of the three primary sides of the one of the plurality of raised portions and the respective secondary side of the other one of the plurality of raised portions.

10. The impact resistant material of claim 9, wherein the channel has a width that is from 50% to 200% of a thickness of the base layer.

11. The impact resistant material of claim 1, wherein the plurality of raised portions are arranged to form three axes of bendability.

12. The impact resistant material of claim 1, wherein the base layer has a length and a width substantially the same as a length and a width of the impact resistant material.

13. The impact resistant material of claim 1, wherein the curvature of each of the primary sides is concave.

14. The impact resistant material of claim 1, wherein the curvature of each of the secondary sides is convex.

* * * * *